(12) United States Patent
Lessmeister

(10) Patent No.: US 7,806,468 B2
(45) Date of Patent: Oct. 5, 2010

(54) BODY EXTENSION FOR A MOTOR VEHICLE

(75) Inventor: Roland Lessmeister, Otterberg (DE)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/427,481

(22) Filed: Apr. 21, 2009

(65) Prior Publication Data

US 2009/0261623 A1  Oct. 22, 2009

(30) Foreign Application Priority Data

Apr. 22, 2008 (DE) .................. 10 2008 020 088

(51) Int. Cl.
*B60J 7/00* (2006.01)
(52) U.S. Cl. ............. 296/210; 296/193.06; 296/203.03; 296/29; 296/97.11
(58) Field of Classification Search ................. 296/210, 296/211, 193.06, 203.03, 193.05, 187.12, 296/29

See application file for complete search history.

(56) References Cited

U.S. PATENT DOCUMENTS

| | | | |
|---|---|---|---|
| 4,883,310 A | * | 11/1989 | Miyazaki et al. ............ 296/210 |
| 6,962,389 B2 | * | 11/2005 | Katsuma ................. 296/187.12 |
| 7,543,884 B2 | * | 6/2009 | Reed et al. ................... 296/210 |
| 2005/0116510 A1 | * | 6/2005 | Leroy et al. ............ 296/216.01 |
| 2006/0202520 A1 | * | 9/2006 | Osterberg et al. ........... 296/210 |

FOREIGN PATENT DOCUMENTS

| | | |
|---|---|---|
| DE | 102004020337 A1 | 8/2005 |
| EP | 0440836 A1 | 8/1991 |
| EP | 1180471 A2 | 2/2002 |
| JP | 2005088611 A | 4/2005 |

OTHER PUBLICATIONS

German Patent Office, German Search Report for German Application No. 102008020088.3, May 4, 2009.

* cited by examiner

*Primary Examiner*—Joseph D Pape
(74) *Attorney, Agent, or Firm*—Ingrassia Fisher & Lorenz, P.C.

(57) ABSTRACT

In a body extension for a motor vehicle, a transverse profile of a roof frame has a central profile section and retaining profile sections arranged at the ends of the central profile section. The retaining profile sections have an embossed area for securing a sun roller blind, and border a trough for accommodating a guide section of a retractable sun roller blind. As a result, the central profile section can be fabricated with a constant cross section using a high grade of steel.

13 Claims, 3 Drawing Sheets

BODY EXTENSION FOR A MOTOR VEHICLE

CROSS-REFERENCE TO RELATED APPLICATION

This application claims priority to German Patent Application No. 102008020088.3, filed Apr. 22, 2008, which is incorporated herein by reference in its entirety.

TECHNICAL FIELD

The technical field relates to a body extension for a motor vehicle with a roof frame provided for purposes of joining to an A pillar, with a transverse profile and a longitudinal profile of the body extension joined to the transverse profile, and the transverse profile has a central profile section, and a retaining profile section is secured at one end of the central profile section, and joins the central profile section with the longitudinal profile.

BACKGROUND

A body extension is known from U.S. Pat. No. 6,962,389 B2. In this body extension, the transverse profile is joined directly with the longitudinal profile via the retaining profile section. The retaining profile section resembles a funnel-shaped expansion of the central profile section. The longitudinal profile goes over to the A pillar in the traveling direction before the transverse profile.

If the goal in a body extension with a so-called panorama pane is to mount a sun visor or roller blind, the central profile section of the transverse profile often is provided with embossed areas, for example, for accommodating the sun visor, or recesses for incorporating guide rails of a roller blind. As a result, the transverse profile has a profile form that is not continuous throughout and attenuated by deformations, so that only a lower grade of steel can be used in its manufacture. For this reason, the central profile section of the transverse profile is provided with a high wall thickness to ensure sufficient rigidity of the roof frame in the event of a crash. However, this high wall thickness leads to high manufacturing costs, and to an undesirably high weight of the body extension.

DE 10 2004 020 337 B4 discloses a roof module with a frame-like inside roof lining module, which is mounted under a transparent roof section. The inside roof lining module exhibits guide rails for a roller blind. One section for the roller blind is situated immediately behind the sun visors. The transparent roof section and inside roof lining module are secured in the roof frame. The disadvantage here is that the roller blind can only cover a very small portion of the roof, since it is mounted inside the roof frame.

Known from EP 1 180 471 A2 is a modular vehicle roof, in which an inner shell is secured to a transparent roof skin. The inner shell accommodates guide rails for a sun roller blind. The sun roller blind is incorporated just under the roof skin. However, the roof skin requires a high structural outlay, and covers essential areas of the transparent roof skin.

In view of the foregoing, at least one object of the invention is to further develop a body extension of the kind mentioned at the outset in such a way that it enables a simple attachment of a shading means, and has an especially low weight. In addition, other objects, desirable features, and characteristics will become apparent from the subsequent detailed description, and the appended claims, taken in conjunction with the accompanying drawings and this background.

SUMMARY

The at least one object, other objects, desirable features and characteristics are achieved by virtue of the fact that the retaining profile section exhibits an embossed area for mounting a swiveling sun visor.

This design makes it possible to omit constrictions and depressions on the central profile section of the transverse carrier. The swiveling sun visor as the shading means can be simply attached to the retaining profile section. Therefore, the central profile section of the transverse profile can be provided with an especially simple shape. High-grade steels can be used for this purpose, so that the wall thickness of the central profile section can be kept particularly low by comparison to the retaining profile section. As a result, the body extension exhibits an especially low weight. Both ends of the central profile section advantageously have a respective retaining profile section with an embossed area for mounting a sun visor.

In an advantageous embodiment of the invention, the body extension according to the invention enables a versatile configuration if the retaining profile section is joined with a connection profile section, and the connection profile section is joined with the longitudinal profile.

In another advantageous embodiment of the invention, the connection profile section helps to greatly reinforce the bond between the roof frame and pillars of the motor vehicle if the connection profile section is arranged in a bond between the A pillars and the longitudinal profile. As a result of this configuration, the body extension according to the invention helps increase the crash safety of the motor vehicle.

For example, a retractable shading means is often desired in the case of motor vehicles with a panoramic roof. Mounting a guide section for this type of shading means at the height of the embossed area of the retractable shading means on the embossed area for the swiveling sun visor would yield a disruptively low positioning of the retractable shading means. However, in another advantageous embodiment of the invention, the guide section for a retractable shading means can be positioned especially high by arranging a trough extending parallel to the longitudinal profile for incorporating a guide section of a retractable shading means in the retaining profile section and/or connection profile section. As a result of this configuration, the guide section of the interior of the motor vehicle is situated higher than the attachment of the swiveling sun visor on the roof. This configuration also enables an individual functional solution for different body variants. The transverse profile is hence suitable for a motor vehicle with and without a panoramic roof.

In another advantageous embodiment of the invention, the rail for guiding the shading means can be arranged especially close to the lateral border of the roof by arranging the trough between the embossed area for accommodating the sun visor and the longitudinal profile of the roof frame.

In another advantageous embodiment of the invention, the trough exhibits a high stiffness if the abutting areas of the retaining profile section and connection profile section each have a U-shaped cross section with legs standing away from a base, and if the respective base of the retaining profile section and the connection profile section is guided to the deepest location of the trough.

In particular in motor vehicles taking the form of stretch limousines, the A-pillar exhibits two pillar sections, of which a front pillar section forms part of a frame of a front pane, and a rear pillar section forms part of a door frame. In another advantageous embodiment of the invention, the attachment of the pillar sections of the A-pillar to the roof frame in such motor vehicles exhibits an especially high stability if the connection profile section joins two pillar sections of the A-pillar. In addition, this imparts an especially high torsional and bending stiffness to the attachment between the roof frame and the A-pillar.

In another advantageous embodiment of the invention, the connection profile section can be especially easily mounted to the roof frame if the connection profile section is designed as a partial piece of the longitudinal profile of the roof frame. This also helps to increase stability at adjacent areas of the longitudinal profile and transverse profile of the roof frame. As a result, the body extension according to the invention also exhibits a particularly low number of components, and is especially easy to manufacture.

To simplify the manufacture of the body extension according to the invention, it helps if the central profile section exhibits a constant cross section. The central profile section advantageously has a W or M-profile.

BRIEF DESCRIPTION OF THE DRAWINGS

The embodiments of the present invention will hereinafter be described in conjunction with the following drawing figures, wherein like numerals denote like elements, and.

DETAILED DESCRIPTION

The following detailed description is merely exemplary in nature and is not intended to limit application and use. Furthermore, there is no intention to be bound by any theory presented in the preceding background and summary or the following detailed description.

Figure 1:
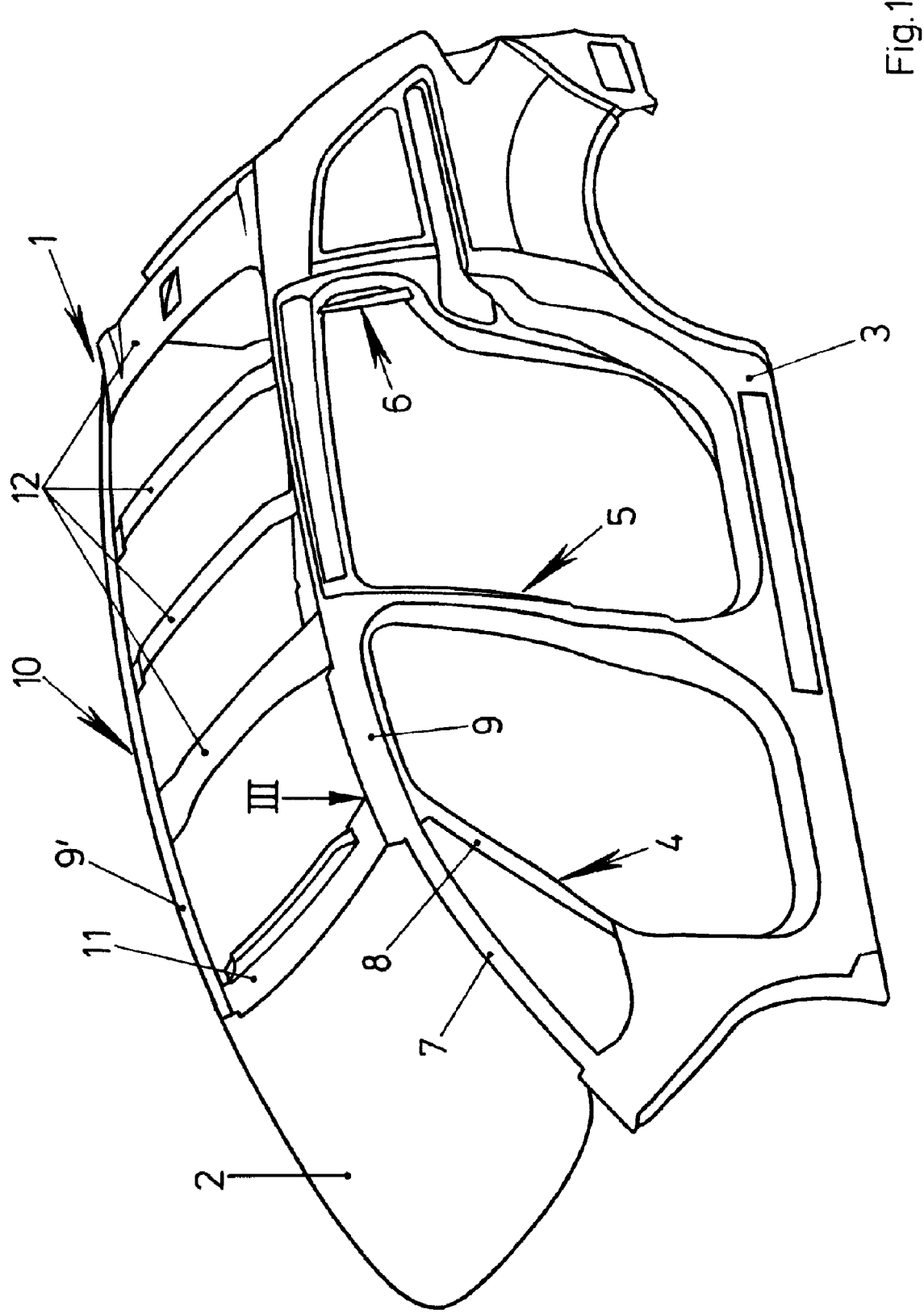
FIG. 1 is a perspective view of a partial area of a motor vehicle body with a body extension according to an embodiment of the invention.

FIG. 1 shows a perspective view of a partial area of the body of a motor vehicle in a crude state with a body extension 1, a front pane 2 facing the traveling direction, and a ground beam 3. The body extension 1 is supported by an A-pillar 4, a B-pillar 5 and a C-pillar 6. The A-pillar 4 exhibits a first pillar section 7 to the front viewed in the traveling direction, and a second, rear pillar section 8. The body extension 1 has a roof frame 10 with two longitudinal profiles 9, 9' and several transverse profiles 11, 12 that join the longitudinal profiles 9, 9' together. The longitudinal profiles 9, 9' face in the traveling direction, and join the A-pillars 4-6 together in the traveling direction. In addition, the longitudinal profiles 9, 9' pass over into the respective front pillar section 7 of the A-pillars 4. The recess between the longitudinal profiles 9, 9' and transverse profiles 11, 12 in the body extension 1 can incorporate a panoramic pane or sunroof (neither shown).

Figure 2:
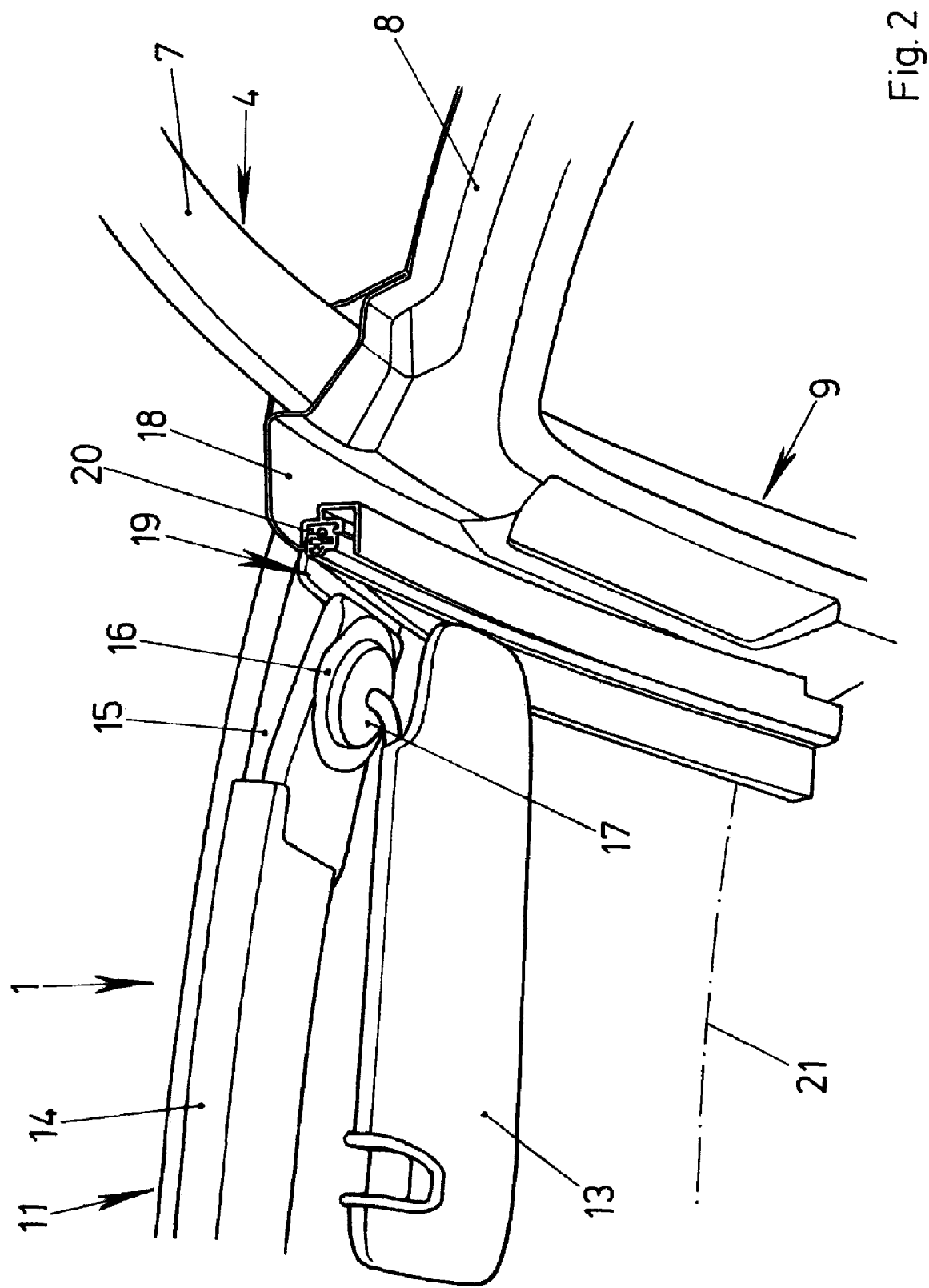
FIG. 2 is a magnified perspective view of the body extension according to the embodiment of the invention from FIG. 1 showing a sun visor.

FIG. 2 shows a magnified perspective view of the bottom side of the transverse profile 11 at the very front of the body extension 1 from FIG. 1 with adjacent areas of the longitudinal profile 9 and pillar sections 7, 8 of the A-pillar 4. A swiveling sun visor 13 is secured to the transverse profile 11. The transverse profile 11 exhibits a central profile section 14. The end of the central profile section 14 is secured to a retaining profile section 15 with an embossed area 16 for attaching a foot 17 of the sun visor 13. The retaining profile section 15 also establishes the connection between the central profile section 14 and the connection profile section 18. The connection profile section 18 joins the transverse profile 11 to the longitudinal profile 9. In addition, the connection profile section 18 links the two pillar sections 7, 8 of the A-pillar 4 together. A trough 19 situated between the connection profile section 18 and retaining profile section 15 accommodates a guide section 20 of a retractable shading means 21 diagrammatically shown on FIG. 2. The retractable shading means 21 can be a simple sun roller blind, for example. The retaining profile section 15 and connection profile section 18 are each guided into the trough, and joined together at this location. The trough 19 for accommodating the guide section 20 of the shading means 21 is arranged between the embossed area 16 for mounting the sun visor 13 and the longitudinal profile 9. In addition, FIG. 2 shows that the connection profile section 18 and retaining profile section 15 are fabricated as three-dimensional structural components, while the central profile section 14 exhibits a constant cross section.

Figure 3:
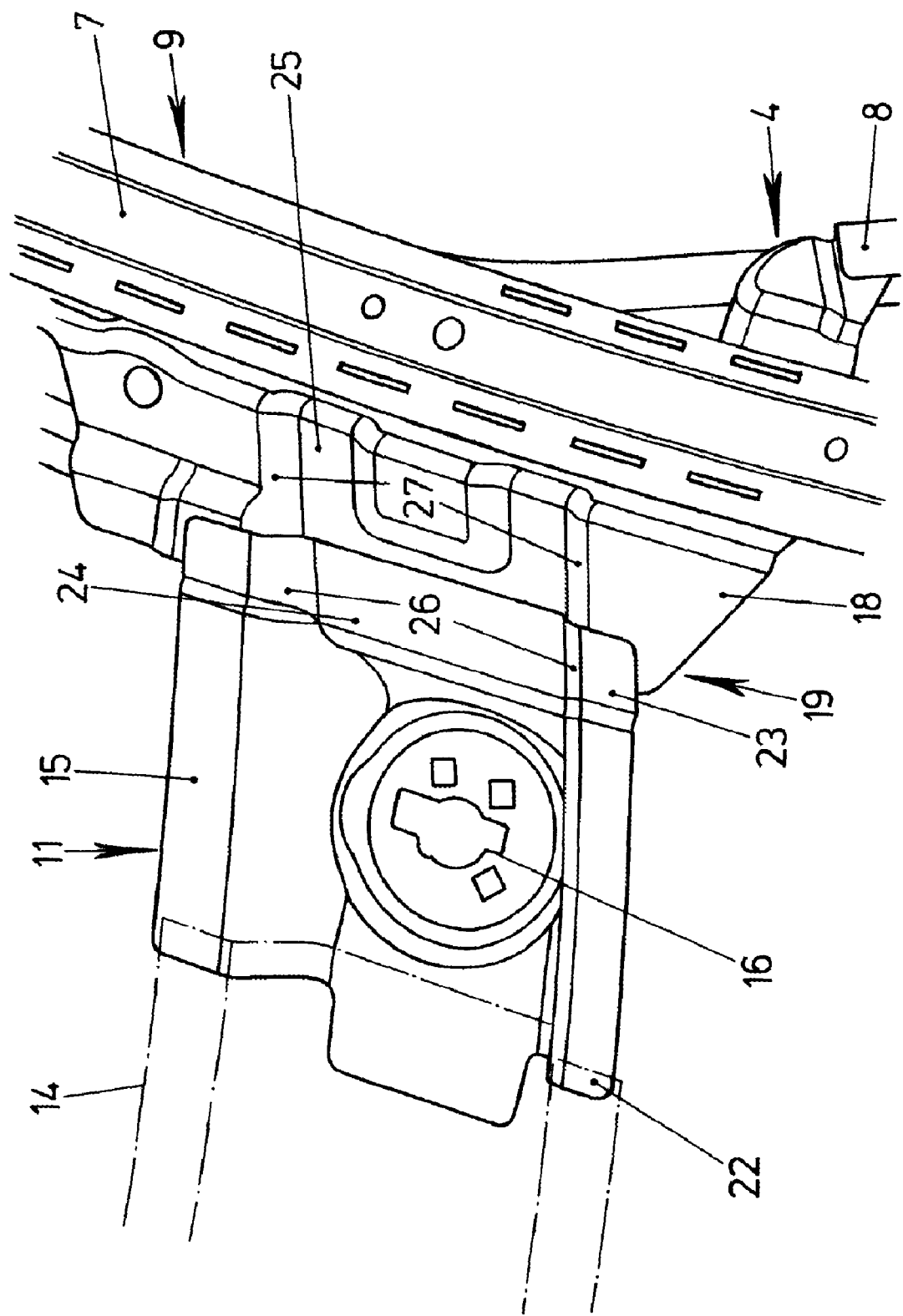
FIG. 3 is a greatly magnified view of a partial area of the body extension from FIG. 1 in position III.

FIG. 3 shows a highly magnified perspective view of the top side of the attachment between the transverse profile 11 and longitudinal profile 9. As evident here, the retaining profile section 15 has a flange 22 for joining the diagrammatically depicted central profile section 14 and a flange 23 for joining to the connection profile section 18. The connection profile section 18 and retaining profile section 15 are U-shaped in their abutting areas, and each has legs 26, 27 standing away from a base 24, 25. The respective base 24, 25 of the retaining profile section 15 and the connection profile section 18 runs into the deepest point of the trough 19.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A body extension for a motor vehicle, comprising:
an A-pillar;
a roof frame adapted for attachment to the A-pillar;
a transverse profile of the roof frame; and
a longitudinal profile of the roof frame secured to the transverse profile,
wherein the transverse profile has a central profile section, and a retaining profile section is secured at one end of the central profile section and joins the central profile section with the longitudinal profile,
wherein the retaining profile section is adapted to exhibit an embossed area for accommodating a swiveling sun visor,
wherein the retaining profile section is joined with a connection profile section and the connection profile section is joined with the longitudinal profile,
wherein a trough extending parallel to the longitudinal profile for incorporating a guide section of a retractable shading means is arranged in the retaining profile section or the connection profile section, and
wherein the trough is arranged between the embossed area for accommodating the swiveling sun visor and the longitudinal profile of the roof frame.

2. A body extension for a motor vehicle, comprising:
an A-pillar;

a roof frame adapted for attachment to the A-pillar;

a transverse profile of the roof frame; and a longitudinal profile of the roof frame secured to the transverse profile, wherein the transverse profile has a central profile section, and a retaining profile section is secured at one end of the central profile section and joins the central profile section with the longitudinal profile, wherein the retaining profile section is adapted to exhibit an embossed area for accommodating a swiveling sun visor, wherein the retaining profile section is joined with a connection profile section and the connection profile section is joined with the longitudinal profile, wherein a trough extending parallel to the longitudinal profile for incorporating a guide section of a retractable shading means is arranged in the retaining profile section or the connection profile section, and wherein abutting areas of the retaining profile section and the connection profile section each have a U-shaped cross section with legs standing away from a base, and a respective base of the retaining profile section and the connection profile section to forms a deepest location of the trough.

3. The body extension of claim 1, wherein the connection profile section is arranged in connection between the A-pillar and the longitudinal profile.

4. The body extension of claim 1, wherein abutting areas of the retaining profile section and the connection profile section each have a U-shaped cross section with legs standing away from a base, and a respective base of the retaining profile section and the connection profile section forms a deepest location of the trough.

5. The body extension of claim 1, wherein the connection profile section joins two pillar sections of the A-pillar.

6. The body extension of claim 1, wherein the connection profile section is designed as a partial piece of the longitudinal profile of the roof frame.

7. The body extension of claim 1, wherein the central profile section is adapted to exhibit a constant cross section.

8. The body extension of claim 2, wherein the connection profile section is arranged in connection between the A-pillar and the longitudinal profile.

9. The body extension of claim 2, wherein the connection profile section joins two pillar sections of the A-pillar.

10. The body extension of claim 2, wherein the connection profile section is designed as a partial piece of the longitudinal profile of the roof frame.

11. The body extension of claim 2, wherein the central profile section is adapted to exhibit a constant cross section.

12. A body extension for a motor vehicle, comprising:

an A-pillar;

a roof frame adapted for attachment to the A-pillar;

a transverse profile of the roof frame; and a longitudinal profile of the roof frame secured to the transverse profile, wherein the transverse profile has a central profile section, and a retaining profile section is secured at one end of the central profile section and joins the central profile section with the longitudinal profile, wherein the retaining profile section is adapted to exhibit an embossed area for accommodating a swiveling sun visor, wherein the retaining profile section is joined with a connection profile section and the connection profile section is joined with the longitudinal profile, wherein the connection profile section joins two pillar sections of the A-pillar, wherein a trough extending parallel to the longitudinal profile for incorporating a guide section of a retractable shading means is arranged in the retaining profile section or the connection profile section, and wherein the trough is arranged between the embossed area for accommodating the swiveling sun visor and the longitudinal profile of the roof frame.

13. The body extension of claim 12, wherein abutting areas of the retaining profile section and the connection profile section each have a U-shaped cross section with legs standing away from a base, and a respective base of the retaining profile section and the connection profile section forms a deepest location of the trough.

\* \* \* \* \*